M. K. WHIPPLE.
Pulleys.

No. 137,270.

Patented March 25, 1873.

WITNESSES:
Thos. H. Dodge
E. E. Moore

INVENTOR:
Moses K. Whipple

UNITED STATES PATENT OFFICE.

MOSES K. WHIPPLE, OF WARREN, MASSACHUSETTS.

IMPROVEMENT IN PULLEYS.

Specification forming part of Letters Patent No. 137,270, dated March 25, 1873.

*To all whom it may concern:*

Be it known that I, MOSES K. WHIPPLE, of Warren, in the county of Worcester and Commonwealth of Massachusetts, have invented certain new and useful Improvements in Pulleys; and I do hereby declare the following to be a full, clear, and exact description of the same, reference being had to the accompanying drawing which forms a part of this specification, and in which—

Figure 2:
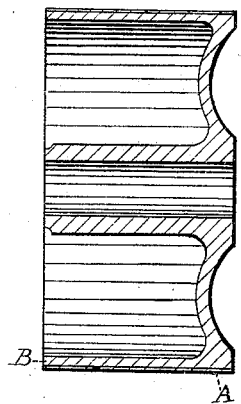
Figure 1:
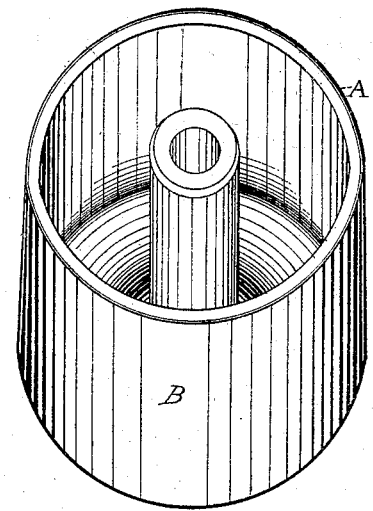

Figure 1 represents a perspective view of one style of pulley having my improvement applied thereto; and Fig. 2 represents a longitudinal central section of the same.

To enable those skilled in the art to which my invention belongs to make and use the same, I will proceed to describe it in detail.

The great objection to running machinery by belts and pulleys results from the liability of the belts to slip during very dry weather, or break in wet or damp weather, if laced sufficiently tight to run without slipping in dry weather.

To remedy these difficulties is the object of my invention, while at the same time enabling manufacturers and others using power to run machinery with narrower belts than they have heretofore been able to do.

In carrying out my said invention the pulleys may be made of cast-iron, in the usual manner, to give the desired stiffness and strength, their faces being made slightly convex or plane, as preferred, but turned smooth by preference, after which a thin strip of copper, A, is applied so as to cover the entire face B of the pulley, as indicated in the drawing. The copper may be soldered on, or it may be riveted on, but I prefer the former plan.

In some cases it may be found advisable to deposit the copper upon the face of the pulleys by means of electric or galvanic batteries.

The effect of making pulleys in this way is to give to a two-inch pulley and belt the capacity of driving nearly, if not quite, as much work as a four-inch belt and pulley made in the ordinary manner. By the use of my copper-covered pulleys the belts employed can be run quite loose without liability to slip, thus avoiding the friction and strain upon the machinery and shafting arising from tight belts, while at the same time the expense of keeping the belts in repair is greatly reduced. In running the driving-rolls of spinning-frames my invention will save large amounts of waste of stock and stoppage of machinery, since there will be much less liability of the belts slipping off or breaking than there is when the spinning-machines are run in the ordinary manner. The same beneficial results follow in all classes of machines used, in which the breaking of a belt or the slipping off of one by being loose occasions a large waste of stock. In addition to the advantages resulting from the use of the invention in the manner just stated, the saving in the expense of pulleys and belts as generally used will be very great by the adoption of my invention, even when the saving in weight and material in the construction of the pulleys is considered.

It will be understood that the form or style of the cast-iron parts of the pulleys may be of any desired shape or any style.

Having described my improvements in pulleys, what I claim therein as new and of my invention, and desire to secure by Letters Patent as an improved article of manufacture, is—

A copper-faced cast-iron pulley, substantially as and for the purposes set forth.

MOSES K. WHIPPLE.

Witnesses:
 THOS. H. DODGE,
 E. E MOORE.